United States Patent [19]

Fiedler, Jr.

[11] 4,180,241
[45] Dec. 25, 1979

[54] SOLENOID OPERATED VALVE AND SHUT-OFF DEVICE

[76] Inventor: Frank Fiedler, Jr., 2429 Agostino Dr., Rowland Heights, Calif. 91748

[21] Appl. No.: 911,274

[22] Filed: May 31, 1978

[51] Int. Cl.² ............................................. F16K 31/02
[52] U.S. Cl. ................................... 251/130; 251/73; 137/461
[58] Field of Search ................. 251/73, 94, 130; 137/461, 463

[56] References Cited

U.S. PATENT DOCUMENTS

| | | | |
|---|---|---|---|
| 2,829,861 | 4/1958 | Wright | 251/130 |
| 3,542,052 | 11/1970 | Irwin | 137/461 X |
| 3,989,222 | 11/1976 | Yoshiyasu | 251/130 X |

*Primary Examiner*—Harold W. Weakley

[57] ABSTRACT

A combined solenoid operated valve and shut-off device including a valve housing defining a fluid inlet, a fluid outlet, and a valve seat therebetween. Located within the housing is a valve closure movable between a closed position in which fluid flow between the inlet and outlet is prevented and an open position wherein such flow is permitted. Controlling movement of the valve closure is a valve operator that includes a magnetic plunger for cycling the valve closure between open and closed positions in response to an electrical signal and a shut-off mechanism activatable to lock the valve closure in its closed position in response to a predetermined fluid pressure at the inlet. After activation of the shut-off mechanism, reopening of the valve to initiate fuel flow between the inlet and outlet requires actuation of a manual reset device.

9 Claims, 2 Drawing Figures

SOLENOID OPERATED VALVE AND SHUT-OFF DEVICE

BACKGROUND OF THE INVENTION

This invention relates generally to a pressure responsive fluid shut-off device and, more particularly, to a device for shutting off a supply of liquid propane (LP) gas in the event that a malfunction in a supply system results in excessive gas pressures.

The appearance of excessive gas pressures in LP gas supply systems introduces substantial risk of fire and explosion. In most domestic LP gas systems, fire and explosion hazards are prevented by a regulator located between an LP gas supply tank and a supply line feeding appliances encompassed by the system. The regulator functions to reduce supply tank pressure, typically above 100 psi, to a safe line pressure of less than 1 psi. However, malfunctions in such regulators often lead to the appearance of hazardous gas pressures in supply lines. A common cause of regulator malfunction is a blockage of vent openings that establish atmospheric reference pressures in typical differential pressure responsive regulators. Upon loss of an accurate atmospheric pressure reference, a regulator can cease to function properly and in some instances, allow a hazardous increase in gas pressure. Also, under certain circumstances, low pressure liquid propane will leak through a regulator valve and then evaporate in the supply line creating hazardous gas pressure therein.

The object of this invention, therefore, is to provide a pressure responsive shut-off device that will eliminate the dangers associated with the inadvertent occurrence of high gas pressure in the supply lines of LP gas systems.

SUMMARY OF THE INVENTION

The invention is a combined solenoid operated valve and shut-off device including a valve housing defining a fluid inlet, a fluid outlet, and a valve seat therebetween. Located within the housing is a valve closure movable between a closed position in which fluid flow between the inlet and outlet is prevented and an open position wherein such flow is permitted. Controlling movement of the valve closure is a valve operator that includes a magnetic plunger for cycling the valve closure between open and closed positions in response to an electrical signal and a shut-off mechanism activatable to lock the valve closure in its closed position in response to a predetermined fluid pressure at the inlet. After activation of the shut-off mechanism, reopening of the valve to initiate fuel flow between the inlet and outlet requires actuation of a manual reset device. The combined valve and shut-off device can be used to control directly gas flow to an individual appliance of a domestic LP gas system. Consequently, the device will prevent the above described hazards associated with the appearance of excessive gas pressures in the supply lines feeding the various appliances of the system. Furthermore, by combining both the gas flow control and safety shut-off functions in a single device, the overall equipment cost for both functions is minimized.

In a featured embodiment of the invention, the valve operator comprises a single actuator rod that is activatable by either the magnetic plunger or the shut-off mechanism to produce movement of the valve closure. The actuator rod is normally latched in a set position within the magnetic plunger and reciprocates therewith to produce the desired cycling of the valve closure. However, in response to an excessive inlet pressure, the actuator rod is moved relative to the plunger by the shut-off mechanism into a release position which locks the enclosure means in closed position and prevents any further gas flow. A resumption of gas flow requires actuation of the reset mechanism that includes a reset button operatively coupled to the magnetic plunger and extending out of the valve housing. Actuation of the reset button moves the plunger relative to the actuator rod so as to produce latching thereof into its set position and thereby permit reopening of the valve.

Another feature of the invention is a compact and low cost housing for a solenoid winding utilized to control the magnetic plunger. The solenoid winding is mounted on a hollow cylindrical portion of the valve housing that retains the magnetic plunger and actuator rod. Forming the solenoid housing is a first annular plate fitted over the hollow cylindrical housing portion, a hollow cylinder enclosing the solenoid winding and having one end abutting the first annular plate, a second annular plate fitted over the hollow cylindrical housing portion and abutting the opposite end of the hollow cylinder and a fastener that secures the second annular plate to the hollow cylindrical housing portion.

DESCRIPTION OF THE DRAWINGS

These and other objects and features of the present invention will become more apparent upon perusal of the following description taken in conjunction with the accompanying drawings wherein.

DESCRIPTION OF THE PREFERRED EMBODIMENT

Figure 1:
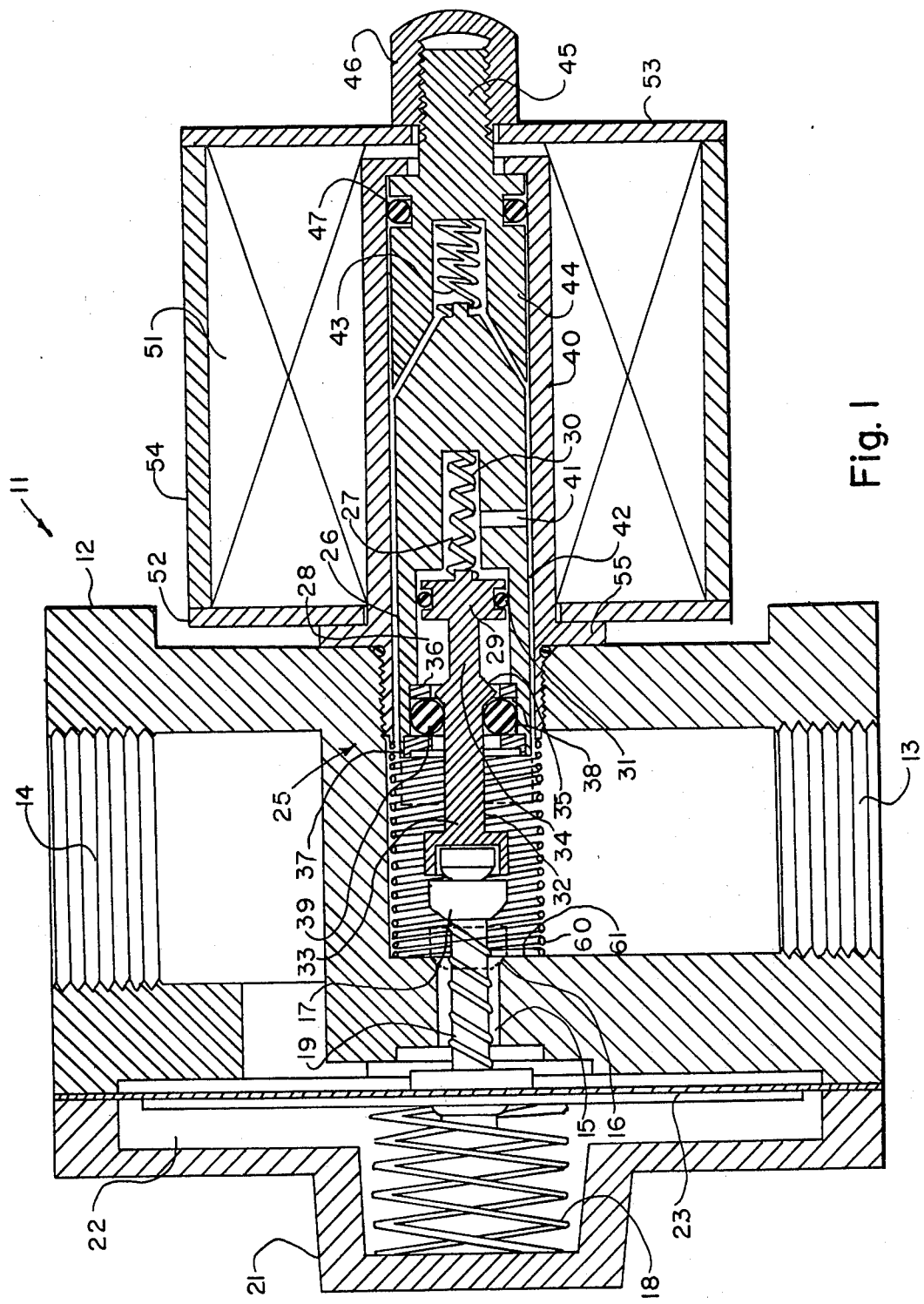
FIG. 1 is a schematic cross-sectional view of a shut-off valve according to the present invention and shown in an open position.

Referring to the Figures, there is shown a valve assembly 11 including a housing 12 that defines a gas inlet 13 and a gas outlet 14 separated by a passage 15 that forms a valve seat 16. Located within the housing 12 is a valve closure 17 that reciprocates between an open position (FIG. 1) away from the valve seat 16 wherein gas flow is permitted between the inlet 13 and the outlet 14 and a closed position (FIG. 2) against the valve seat 16 wherein fluid flow is prevented. A connecting rod 19 is coupled between the closure 17 and a coil spring 18 that biases the valve toward its open position. Enclosing the spring 18 is a cover 21 that forms a vented chamber 22 sealed from the valve inlet 14 by a flexible diaphragm 23.

Also located within the valve housing 12 is an operator mechanism 25 that controls operation of the valve 11. The operator 25 includes a cylinder body 26 that defines both an activating volume 27 and a reference volume 28 separated by a reciprocable piston 29. Connecting the cylinder body 26 to the piston is a compressed spring 30. The activating volume 27 is sealed from the reference volume 28 by an O-ring 31 retained by a groove in the periphery of the piston 29. Extending between the piston 29 and the closure 17 is an actuator rod 32 that is also a part of the operator mechanism 25. The actuator rod 32 includes a first longitudinal rod portion 33 of one diameter and a second longitudinal rod portion 34 of a smaller diameter. Located between the rod portions 33 and 34 is an annular rib 35 that projects radially beyond the outer surface of the first rod portion 33. At the end of the reference volume 28 opposite to the piston 29 is an annular groove 38 formed by a pair of washers 36 and 37 retained by internal shoulders on the cylinder body 26. An O-ring seal 39 is received by the groove 38 and possesses an internal diameter that seals against the first actuator rod portion 33 with the operator 25 in the position shown in FIG. 1. However, with the operator 25 in the position shown in FIG. 2, the O-ring seal 39 allows fluid flow around the second rod portion 34 between the inlet 13 and the reference volume 28. Enclosing the cylinder body 26 is a cylindrical housing 40 that extends from and is secured by threads to the main housing 12.

Providing fluid communication between the inlet 13 and the activating volume 27 are a passage 41 through the cylinder body 26 and an annular clearance 42 between the cylinder body 26 and the cylindrical housing 40. Also retained by the cylindrical housing 40 and coupled to the cylinder body 26 by a spring 43 is a reset mechanism 44. The reset mechanism 44 includes a reset button 45 that projects out of the housing 44 and is externally threaded to receive a reset nut 46. An O-ring 47 retained by an annular groove in the reset mechanism 44 seals the interior of the valve housing 12 from the atmosphere.

An annular solenoid winding 51 is positioned over the cylindrical housing 40 and activates the cylinder body 26 that functions as a solenoid plunger. Longitudinally retaining the solenoid winding 51 on the cylindrical housing 40 is a pair of washers 52 and 53 that straddle a winding enclosing cylinder 54. The inner washer 52 engages a flange 55 on the cylindrical housing 40 and is abutted by one end of the enclosing cylinder 54. The opposite end of the cylinder 54 receives and is secured to the outer washer 53 by the nut 46.

Also mounted within the housing 12 is a spiral spring 60 that removes particulate impurities being transmitted with the gas flowing between the inlet 13 and the outlet 14. The spiral spring 60 is compressed between an annular planar surface 61 encircling the orifice 16 and a planar surface 62 defined by a peripheral edge of the cylindrical housing 40. The spiral spring 60 surrounds and is actually aligned with the actuator rod 32 and the plunger body 26 so as to accommodate longitudinal movement thereof.

In typical use of the valve 11, the outlet 14 is connected directly to a gas appliance such as a stove, hot water heater, refrigerator, etc., and the inlet 13 is connected to a source of LP gas. The solenoid winding 51 is electrically connected for energization by a temperature controller (not shown) associated with the appliance being served. In the absence of a call for fuel, the solenoid 51 is de-energized and the compressed spring 43 forces the plunger 26 into the position shown by dotted lines in FIG. 1 to thereby close the orifice 15 and prevent gas flow between the inlet 13 and the outlet 14. In response to a call for gas, however, the solenoid winding 51 is energized to move the plunger 26 into the position shown by solid lines in FIG. 1. This allows the spring member 18 to force the closure 17 into its open position and initiate gas flow between the inlet 13 and the outlet 14.

Figure 2:
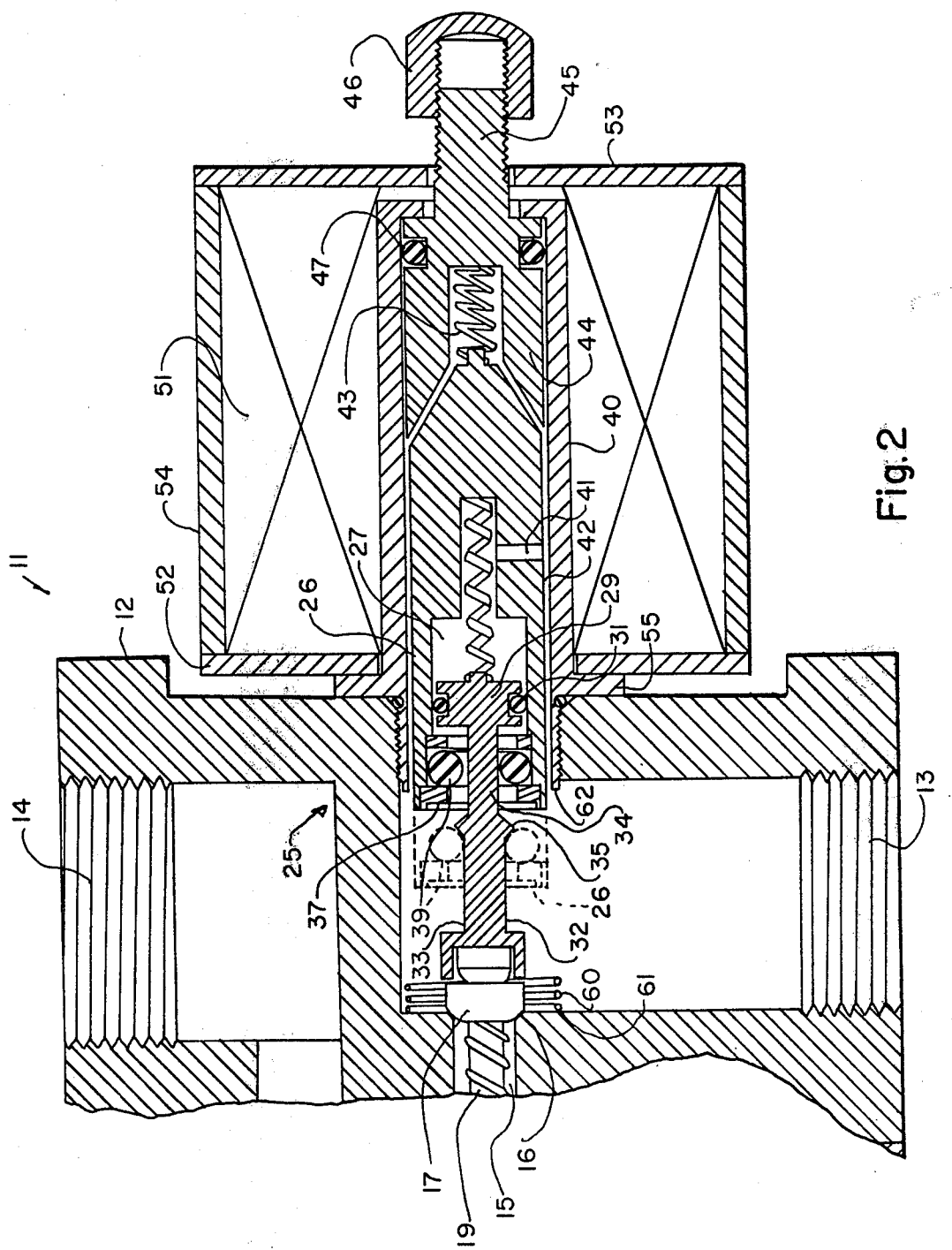
FIG. 2 is a partial schematic cross-sectional view showing the shut-off valve of FIG. 1 in a closed position.

During such normal operation of the valve 11, the operator mechanism 25 is inactive and the parts thereof remain in the relative positions shown in FIG. 1. With the operator 25 in that set position, there exists a resultant force tending to move the actuator rod 32 into the release position shown in FIG. 2 and thereby eliminate gas flow between the inlet 13 and the outlet 14. This resultant force includes the gas pressure at the inlet 13 times the area of the piston 29 minus the cross-sectional area of the first rod portion 33 plus the force exerted by the spring member 30. It will be noted that the force provided by the pressure in the activating volume 27 against the full face of the piston 29 is opposed only by inlet gas pressure times the cross-sectional area of the first rod portion 33 because the reference volume 28 is sealed from the inlet 13 by the O-ring seal 39 with the piston 29 in the set position of FIG. 1. The resultant force tending to move the piston 29 into its release position of FIG. 2 is restrained during normal operating conditions by the latching effect created by engagement between the annular rib 35 and the O-ring 39. However, as inlet gas pressure increases, the resultant force on the actuator rod 32 also increases because of the differential pressure characteristic described above. At some predetermined inlet pressure, the closing force on the rod 32 is sufficient to overcome the effect of the latch 35 and the actuator rod 32 moves the valve closure 17 against the seat 16 as shown in FIG. 2 and thereby prevents gas flow between the inlet 13 and the outlet 14. It will be noted that once the latching rib 35 has been forced through the O-ring seal 39, the reduced diameter of the second rod portion 34 provides a fluid communication path between the inlet 13 and the reference volume 28. Consequently, the decreasing volume of the reference chamber 28 does not experience a pressure build-up that would prevent closure of the valve.

Once the operator 25 has functioned to close the valve orifice 15, reopening of the valve can be accomplished only by a manual reset of the device. To accomplish reset, the reset nut 46 is backed off of the reset button 45 as shown in FIG. 2. The button 45 is then depressed forcing the reset mechanism 44 and the cylinder plunger 26 into the cylinder housing 40 as shown by dotted lines in FIG. 2. During this movement the actuator rod 32 is abutted against the seated closure 17 and remains stationery. In this manner, the O-ring seal 39 is forced over the latching rib 35 to again become latched therewith. It will be noted again that during this reset movement by the plunger cylinder 26, a pressure build-up does not occur in the reference chamber 28 because of the communication path provided around the reduced diameter second rod portion 34. Next the nut 46 is gripped and pulled outwardly drawing the plunger cylinder 26 and latched therewith actuator rod 32 back to their original set positions shown in FIG. 1. After reset, the spring member 18 moves the closure 17 off of the seat 16 to open the valve 11 and permit control thereof by the solenoid winding 51.

Obviously, many modifications and variations of the present invention are possible in light of the above teachings. It is therefore to be understood that within the scope of the appended claims the invention can be practised otherwise than as specifically described.

What is claimed is:

1. A combined solenoid operated valve and shut-off device comprising:
   a valve housing means defining a fluid inlet, a fluid outlet and a valve seat therebetween;
   a valve closure means movable between a closed position against said valve seat and an open position away therefrom, said closure means preventing fluid flow between said inlet and outlet when in said closed position and permitting said fluid flow when in said open position;

a valve operator means coupled to said valve closure means and operative to produce movement thereof between said open and closed positions, said valve operator means comprising electromagnetic means for cycling said valve closure means between said open and closed positions in response to an electrical signal input, and said valve operator means further comprising shut-off means activatable to move said valve closure means to said closed position and to lock said closure means therein in response to a predetermined fluid pressure at said inlet; and manual reset means for returning said valve closure means to said open position after activation of said shut-off means.

2. A device according to claim 1 wherein said valve operator means comprises an actuator means coupled to said valve closure means and activatable to produce movement thereof by both said electromagnetic means and said shut-off means.

3. A device according to claim 2 wherein said electromagnetic means comprises a reciprocable magnetic plunger coupled to said actuator means and electromagnetically activatable to produce movement of said actuator means.

4. A device according to claim 3 wherein said actuator means is mounted on said plunger for movement between a set position which permits said cycling of said valve closure means and a release position which locks said closure means in said closed position, and said shut-off means controls movement of said actuator means from said set to said release position.

5. A device according to claim 4 including latching means for latching said actuator means in said set position.

6. A device according to claim 5 wherein said shut-off means comprises a piston, said actuator means comprises a reciprocable rod operatively coupled between said piston and said closure means, and said magnetic plunger defines a hollow cylinder for accommodating reciprocating movement of said piston.

7. A device according to claim 6 wherein said reset means comprises a reset mechanism operatively coupled to said valve operator means and extending through said valve housing means, said reset mechanism being manually operable to induce said latching of said actuator means in said set position.

8. A device according to claim 3 wherein said housing means comprises a hollow cylindrical portion retaining said magnetic plunger, and including a hollow core solenoid winding mounted on said hollow cylindrical portion so as to activate said magnetic plunger in response to an electrical signal input.

9. A device according to claim 8 including a solenoid housing for said solenoid winding, said solenoid housing comprising a first end wall formed by a first annular plate fitted over said hollow cylindrical portion, a side wall forced by a hollow cylinder with one end abutting said first annular plate, a second annular plate fitted over said hollow cylindrical portion and abutting the opposite end of said hollow cylinder, and a fastener for securing said second plate to said hollow cylindrical portion.

* * * * *